United States Patent [19]

Daito et al.

[11] Patent Number: 4,853,812

[45] Date of Patent: Aug. 1, 1989

[54] STRUCTURE FOR SUPPORTING MAGNETIC HEAD

[75] Inventors: Hiroshi Daito, Kanagawa; Sigeo Hara, Minami-ashigara, both of Japan

[73] Assignee: Hitachi, Ltd., Tokyo, Japan

[21] Appl. No.: 153,099

[22] Filed: Feb. 8, 1988

[30] Foreign Application Priority Data

Feb. 10, 1987 [JP] Japan .................................. 62-27088

[51] Int. Cl.$^4$ .............................................. G11B 5/48
[52] U.S. Cl. .................................................... 360/104
[58] Field of Search ................................ 360/104–105

[56] References Cited

U.S. PATENT DOCUMENTS 3,931,641  1/1976  Watrous ............................ 360/104
4,167,765  11/1979  Watrous .

FOREIGN PATENT DOCUMENTS 55-22296  6/1980  Japan .

59-221872  12/1984  Japan ................................... 360/104

*Primary Examiner*—A. J. Heinz
*Attorney, Agent, or Firm*—Fay, Sharpe, Beall, Fagan, Minnich & McKee

[57] ABSTRACT

A magnetic head supporting structure includes a gimbal member which carries a core slider and which is provided with a loading projection, and a loading beam member having one end connected with the gimbal member and contacting the loading projection to urge the core slider towards a recording medium. The surface of the portion of the loading beam member contacting the loading projection is offset from the surface of the loading beam member connected with the gimbal member, to thereby reduce the height difference between the plane and the centroid of the core slider. The reduced height difference reduces the moment which acts on the core slider during movement thereof, thus enabling the core slider to stably float without inclination with respect to the magnetic recording surface.

3 Claims, 2 Drawing Sheets

STRUCTURE FOR SUPPORTING MAGNETIC HEAD

BACKGROUND OF THE INVENTION

The present invention broadly relates to a magnetic disk apparatus having a magnetic disk as a magnetic recording medium and a core slider as a magnetic head which floats above but is held adjacent to the magnetic disk so as to record and reproduce data on and from the recording medium. More particularly, the present invention relates to a structure for supporting the magnetic head in a magnetic disk apparatus of the type specified above and which is improved to increase the recording density and to shorten the access time.

A typical known magnetic head supporting structure is disclosed in Japanese Unexamined Patent Publication No. 55-22296 (corresponding to U.S. Pat. No. 4,167,765) and has a gimbal member 2 (see FIG. 4) which holds a core slider 1 as the magnetic head and a loading beam member 4 to one end of which the gimbal member 2 is secured. The gimbal member 2 is made of a thin resilient plate member to one end of which the core slider 1 is attached. A loading projection 3 is provided on the portion of the gimbal member 2 where the core slider 1 is mounted, in such a manner as to spherically project in the direction opposite to the core slider 1.

As in the case of the gimbal member 2, the loading beam member 4 is made of a thin resilient plate. The other end of the gimbal member 2, i.e., the end of the gimbal member opposite to the core slider 1, is secured to one end of the loading beam member 4. The loading projection 3 of the gimbal member 2 contacts the other end of the gimbal member 2 so that the loading beam member 4 loads the gimbal member 2 through the loading projection 3 so as to urge the core slider 1 towards a surface of a magnetic disk 5 which is a magnetic recording medium. The loading beam member 4 is connected at its other end to a driving means 6. When the driving means 6 is activated to move linearly, the core slider 1 held by the gimbal member 2 is moved in the radial direction of the magnetic disk 5.

According to the described prior art construction of the magnetic head supporting structure, the loading beam member 4 urges, through the loading projection 3, the core slider 1 towards the surface of the magnetic disk 5. During the rotation of the magnetic disk 5, a flow of air is generated by the running surface of the magnetic disk 5 and causes the core slider 1 to be moved away from the surface of the magnetic disk 5 against the urging force produced by the loading beam member 4, while the magnetic disk 5 is scanned by the core slider 1 in the radial direction as a result of the linear movement of the loading beam member 4, whereby data is recorded on a desired portion of the magnetic disk 5 or read from a desired portion of the magnetic disk 5. By virtue of the spherical form of the loading projection 3 which is supported by the loading beam member 4 through the gimbal member 2, the core slider 1 is always oriented to squarely face the plane of the surface of the magnetic disk 5, thereby ensuring a high degree of recording and reading accuracy of the data.

There is a current demand, in order to achieve a higher recording density, to decrease the distance of the core slider from the surface of the magnetic disk. Also, it is desired to increase the seeking speed of the core slider to shorten the access time required for the core slider to access to a desired track on the magnetic disk.

The prior art magnetic head supporting structure described above, however, cannot fully meet these demands because, when the core slider 1 is driven by the loading beam member 4 during seeking, the core slider 1 tends to oscillate in the rolling direction and tilt as illustrated in FIG. 5. This is due to an acceleration generated during the movement, with the result that the core slider 1 abnormally approaches the surface of the magnetic disk 1 or undesirably contacts it.

More specifically, when the core slider 1 moves, the core slider 1 receives a force F which is represented by $F = m \cdot a$ where m represents the mass of the core slider 1 while $a$ represents the acceleration. This force F is applied to the gimbal member 2 and is borne at a point P where the gimbal member 2 is secured to the loading beam member 4. In consequence, a moment $M = F \times L$, where L represents the distance $(l_1 + l_2)$ between the point P and a centroid O of the core slider, is generated about the point P.

The core slider 1 is spaced from the magnetic disk 5 by an extremely small distance or gap. The moment M tends to cause the core slider 1 to oscillate in the rolling direction about a fulcrum which is constituted by a point Q where the loading projection 3 and the loading beam member 4 contact each other, with the result that a portion of the core slider 1 becomes abnormally close to the magnetic disk 5 or contacts the same.

This problem is serious, particularly when the lift or floating distance of the magnetic head from the disk is decreased for attaining a higher recording density and the seeking speed is increased for the purpose of shortening the access time.

SUMMARY OF THE INVENTION

Accordingly, an object of the present invention is to provide a magnetic head supporting structure which enables the core slider to be stably spaced from a magnetic recording medium so as to avoid abnormal approach of the core slider to the magnetic recording medium surface and accidental contact therebetween, thereby overcoming the above-described problems of the prior art.

According to the present invention, there is provided a magnetic head supporting structure of the class specified above and in which a loading beam member has a first surface contacting a loading projection and a second surface connected with a gimbal member and in which the first surface is offset from the second surface to reduce a difference in height between the second surface and a centroid of a core slider.

In operation, the core slider or magnetic head is spaced from the running surface of a rotating magnetic disk or recording medium and moves in the radial direction of the magnetic disk so as to effect recording or reading of data onto and out of the magnetic disk.

As explained before, the core slider tends to be tilted by the moment M which is produced by the acceleration applied to the core slider when it starts to move or when it stops. According to the invention, however, the tilting of the core slider is minimized because the difference in height between the point where the loading beam member and the gimbal member are connected and the centroid of the core slider is reduced by virtue of the fact that the area of the loading beam member contacted by the loading projection of the gimbal member is offset by a dimension corresponding to the height of projection of the loading projection. This means that the moment M is reduced to ensure that the core slider can stably float without substantial inclination with respect to the surface of the magnetic disk, thus eliminating any abnormal approach of the core slider to the magnetic disk surface and accidental contact therewith. In consequence, higher recording density and shorter access time are obtainable by the use of the magnetic head supporting structure constructed in accordance with the present invention.

DESCRIPTION OF THE PREFERRED EMBODIMENT

Figure 1:
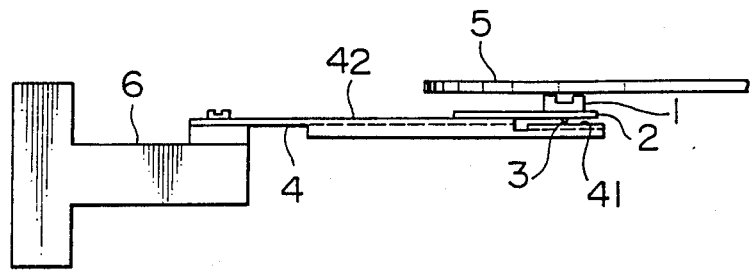
FIG. 1 is a schematic side elevational view of an embodiment of the magnetic head supporting structure constructed in accordance with the present invention.
Figure 2:
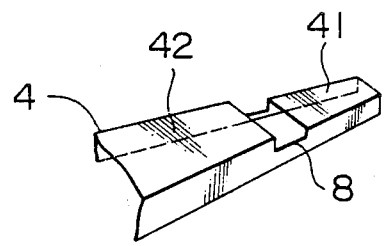
FIG. 2 is a partial perspective view of a loading beam member.
Figure 3:
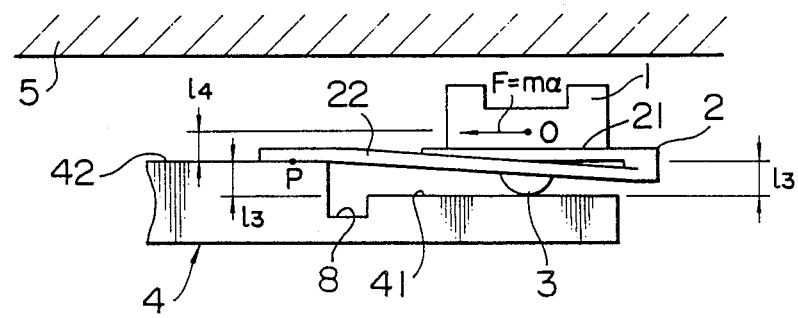
FIG. 3 is an enlarged partial fragmentary side view of the embodiment shown in FIG. 1 illustrating the behavior of a core slider during movement thereof.
Figure 4:
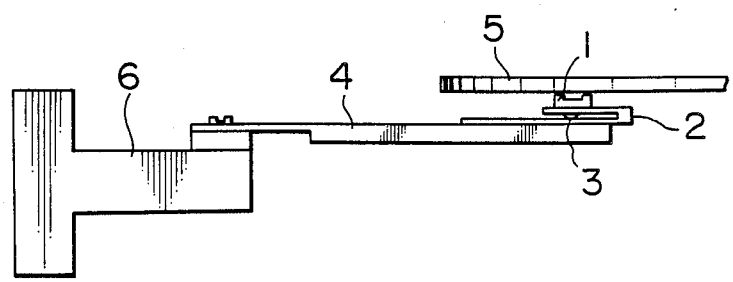
FIG. 4 is a side elevational view of the prior art magnetic head supporting structure.
Figure 5:
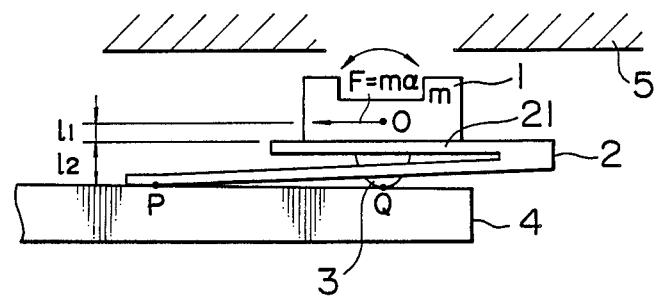
FIG. 5 is similar to FIG. 3 but illustrates the behavior of a core slider of the prior art during movement thereof.

Referring to FIGS. 1 to 3, the magnetic head supporting structure of this embodiment has a gimbal member 2 carrying a core slider 1 as the magnetic head. Member 2 is provided with a loading projection 3, and a loading beam member 4 contacting the loading projection 3. One end of member 4 is connected to the gimbal member 2, so as to urge the core slider 1 towards a magnetic disk 5.

The loading beam member 4 is recessed at a portion where it contacts the loading projection 3 of the gimbal member 2 to provide a contact surface 41. More specifically, as shown in FIG. 3, the contact surface 41 is offset by a dimension, which is equal to the projecting height $l_3$ of the loading projection 3, from the plane of a surface 42 of the loading beam member 4 where the gimbal member 2 is connected to the loading beam member. This offset minimizes the height or distance $l_4$ between the surface 42 of the loading beam member 4 where the gimbal member 2 is connected to the loading beam member 4 and the centroid O of the core slider 1. In the magnetic head supporting structure of the illustrated embodiment of the present invention, therefore, a portion 22 of the gimbal member 2 connected to the loading beam member 4 is inclined downwardly towards the contact surface 41.

A notch 8 is formed in a portion of the loading beam member 4 between the surface 42 to which the gimbal member 2 is attached and the contact surface 41. Notch 8 is provided to prevent any deformation of the surface 41 which would tend to occur when the offset contact surface 41 is formed by a pressing operation.

In operation, when the magnetic disk 5 rotates, the core slider 1 is spaced from the surface of the magnetic disk 5. The core slider is also moved radially across magnetic disk 5 so as to perform recording and reading of data into and out of desired tracks on the magnetic disk 5. The core slider 1 tends to oscillate and tilt due to an acceleration generated during movement thereof.

According to the invention, however, the oscillating tendency of the core slider 1 is suppressed due to the fact that the contact surface 41 of the loading beam member 4 is downwardly offset from the plane of the surface 42 of the loading beam member 4 where the gimbal member 2 is connected to the loading beam member, by an amount which corresponds to the height of the loading projection 3. Namely, in the illustrated embodiment of the magnetic head supporting structure of the present invention, the height difference or distance $l_4$ between the surface 42 of the loading beam member 4 and the centroid O of the core slider 1 is reduced to a value which is the sum of the thickness of a portion 21 of the gimbal member 2 and the height between the portion 21 and the top surface of centroid O of the core slider 1. Thus, the aforementioned moment expressed by $M = F \times l_4$ is reduced as compared with the moment produced in the known supporting structure, by an amount corresponding to the height of the loading projection 3.

Since the moment M applied to the core slider 1 during movement thereof is reduced, the tendency for the core slider 1 to tilt with respect to the plane of the surface of the magnetic disk 5 is suppressed to ensure a higher stability of the core slider 1, whereby problems, such as the abnormal approach of the core slider 1 to the magnetic disk 5 and the accidental contact therewith, can be eliminated.

In the illustrated embodiment, the centroid O of the core slider 1 is located at a certain height from the bottom surface of the core slider 1. This, however, is only illustrative and the core slider 1 may be designed and constructed such that the centroid O thereof is located very close to the bottom surface. In such a case, the thickness of the gimbal member 2 is negligible. In consequence, the aforementioned height difference or distance $l_4$ and, hence, the moment M can be reduced substantially to zero, thus ensuring an extremely high level of stability.

As will be understood from the foregoing description, according to the present invention, the surface of the portion of the loading beam member contacting the loading projection of the gimbal member is offset by an amount corresponding to the height of the loading projection of the gimbal member to reduce the height difference or distance between the surface of the loading beam member connected to the gimbal member and the centroid of the core slider 1. Therefore, the moment applied to the structure during movement of the core slider is reduced to suppress the tendency for the core slider to tilt with respect to the surface of the magnetic recording medium, thereby preventing the core slider from abnormally approaching the magnetic disk or contacting therewith, thus ensuring a higher degree of stability of the floating core slider.

In consequence, the magnetic head supporting structure of the present invention enables a magnetic head to be satisfactorily used in combination with a magnetic recording medium to provide a high recording density and a shorter access time in the apparatus of the kind described.

What is claimed is:

1. A magnetic head supporting structure, comprising:
a gimbal member supporting a core slider and having a loading projection at a first portion;
and a loading beam member having first and second surfaces at one end thereof, said gimbal member having a second portion being secured to said loading beam member at said second surface and said loading beam member contacting said loading projection at said first surface to urge said core slider towards a recording medium, said first surface being offset from said second surface to reduce a difference in height between said second surface and a centroid of said core slider, and said gimbal member having an inclined portion extending from said first portion to said second portion.

2. A magnetic head supporting structure according to claim 1, wherein a notch is formed in said loading beam member between said first and second surfaces.

3. A magnetic head supporting structure comprising a loading beam member including a first resilient spring section and a second section having flanges formed along opposite sides thereof to increase the rigidity thereof, a core slider, and a gimbal member supporting said core slider and having a loading projection, said gimbal member being mounted on said second section of said loading beam member, said loading beam member having a first surface in contact with said loading projection, said second section of said loading beam member having a second surface on which said gimbal member is mounted, said first surface is offset from said second surface by a dimension substantially equal to a height of said loading projection, and a notch being formed in said loading beam member between said first and second surfaces.

* * * * *